United States Patent
Bae et al.

(10) Patent No.: US 6,993,775 B2
(45) Date of Patent: Jan. 31, 2006

(54) TRAY LOCKING APPARATUS OF DISC DRIVE

(75) Inventors: Byoung-young Bae, Gyeonggi-do (KR); Un-jin Choi, Seoul (KR); Soon-kyo Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 10/160,433

(22) Filed: Jun. 4, 2002

(65) Prior Publication Data

US 2003/0103433 A1 Jun. 5, 2003

(30) Foreign Application Priority Data

Dec. 1, 2001 (KR) ........................................ 2001-75672

(51) Int. Cl.
*G11B 33/02* (2006.01)

(52) U.S. Cl. ........................................................ 720/610
(58) Field of Classification Search ................ 720/601, 720/610, 636, 639; 369/75.21, 77.21; 360/99.02, 360/99.06
See application file for complete search history.

(56) References Cited

U.S. PATENT DOCUMENTS

| | | | | | |
|---|---|---|---|---|---|
| 4,707,819 | A | * | 11/1987 | Ehara | .......................... 720/639 |
| 5,386,403 | A | * | 1/1995 | Morioka et al. | ......... 369/30.98 |
| 6,181,663 | B1 | * | 1/2001 | Kakuta et al. | .............. 720/610 |
| 6,320,724 | B1 | * | 11/2001 | Suzuki | ..................... 360/99.02 |
| 6,782,543 | B2 | * | 8/2004 | Ahn | ........................... 720/601 |

FOREIGN PATENT DOCUMENTS

| | | |
|---|---|---|
| JP | 9-231651 | 9/1997 |
| JP | 9-274754 | 10/1997 |
| JP | 11-353752 | 12/1999 |
| JP | 2000-30335 | 1/2000 |
| JP | 2001-52420 | 2/2001 |
| JP | 2001-266442 | 9/2001 |

OTHER PUBLICATIONS

Korean Office Action dated Aug. 10, 2004.

* cited by examiner

*Primary Examiner*—Angel Castro
(74) *Attorney, Agent, or Firm*—Stein, McEwen & Bui, LLP

(57) ABSTRACT

A tray locking apparatus of a disc drive to lock a tray on which a disc is placed and which is inserted into a main body of a disc drive. The tray locking apparatus includes a locking boss provided at the main body, a locking plate installed at the tray to slide and having a locking portion provided at one side thereof which is caught by the locking boss as the tray enters the main body, an elastic member to elastically bias the locking plate in a direction in which the locking portion is caught by the locking boss, and a driving mechanism to make the locking plate slide to be out of a position where the locking portion is caught by the locking boss when the tray is drawn. Thus, even when an external impact is applied, the locking state can be firmly maintained. Also, electric power consumed for the locking and unlocking operations is reduced.

15 Claims, 13 Drawing Sheets

TRAY LOCKING APPARATUS OF DISC DRIVE

CROSS-REFERENCE TO RELATED APPLICATIONS

This application claims the benefit of Korean Application No. 2001-75672, filed Dec. 1, 2001, in the Korean Industrial Property Office, the disclosure of which is incorporated herein by reference.

BACKGROUND OF THE INVENTION

1. Field of the Invention

The present invention relates to a tray locking apparatus of a disc drive to lock a tray inserted into the disc drive and unlock the tray to be ejected.

2. Description of the Related Art

In a known disc drive using a disc as a recording medium, a tray to carry the disc into the disc drive is provided. That is, when the disc is placed on the tray and inserted into the disc drive, the disc is loaded at an installation position in the disc drive and then recording and/or reproduction is performed to/from the disc. Since the tray must not be ejected during recording and/or reproduction, a tray locking apparatus to lock the tray in the disc drive is provided.

FIG. 1 shows the structure of a tray locking apparatus disclosed in Japanese Patent Publication No. 2000-11513. As shown in FIG. 1, the tray locking apparatus includes a locking pin 35 provided in a main body 13 of a disc drive, a locking lever 50 installed at the lower surface of a tray 14 to be selectively locked by the locking pin 35, and a driving mechanism 60 to drive the locking lever 50.

The locking lever 50 includes an arm 51 installed to rotate around a rotation shaft 53 provided at the lower surface of the tray 14, on which a hook portion 51a coupled to the locking pin 35 is formed, and a lever 52 installed to rotate around the rotation shaft 53. As shown in FIG. 1, the arm 51 is elastically biased clockwise with respect to the lever 52, by a first spring 55 and the lever 52 is elastically biased clockwise with respect to the tray 14 by a second spring 56. Thus, the net result is that the locking lever 50 receives an elastic force in the direction in which the hook portion 51a is coupled to the locking pin 35.

Also, the driving mechanism 60 includes a plunger 63 supported by a yoke 62 and having one end coupled to a coupling pin 52e of the lever 52, a permanent magnet 64 attracting the other end of the plunger 63, and a coil 61 wound around the yoke 62 and applying an electrostatic force to the plunger 63.

When the tray 14 having a locking apparatus is inserted into the main body 13 of the disc drive, the hook portion 51a of the arm 51 is interfered with and pushed by the locking pin 35 and the arm 51 rotates counterclockwise, as shown in FIG. 2A. As the tray 14 continues to enter and is completely loaded at an installation position in the main body 13 of the disc drive, as shown in FIG. 2B, the arm 51 returns to the original position by an elastic force of the first spring 55 so that the hook portion 51a is caught by the locking pin 35. Thus, as the hook portion 51a is caught by the locking pin 35, the tray 14 is not ejected from the main body 13 of the disc drive. Here, since current flows such that an electromagnetic force in the opposite direction to an attracting force by the permanent magnet 64 can act on the plunger 63, the state in which the two forces are offset is maintained.

In the meantime, when the tray 14 is drawn from the main body 13, the direction of current flowing in the coil 61 is controlled so that an electromagnetic force acts on the plunger 63 in the same direction as the attracting force of the permanent magnet 64. Thus, the plunger 63 receiving the attracting force of the permanent magnet 64 and the electromagnetic force formed by the current flowing in the coil 61 moves toward the permanent magnet 64, as shown in FIG. 2C. Here, as the plunger 63 pulls the coupling pin 52e, the locking lever 50 is rotated counterclockwise. Accordingly, the hook portion 51a is unlocked from the locking pin 35 so that the tray 14 can be smoothly drawn from the main body 13.

Typically, a push unit (not shown) to apply an elastic force to force the tray 14 out of the main body 13 is installed in the main body 13. Thus, as soon as the locking is released, the push unit slightly pushes the tray 14 outside the main body 13. Then, a user is only needed to manually pull the tray 14 to draw it from the main body 13. When the locking is released so that the tray 14 is drawn, current is applied again to the coil 61 of the driving mechanism 60 so that an electromagnetic force acts on the plunger 63 in the direction opposite to the attracting force of the permanent magnet 64. Then, the two forces are offset so that the plunger 63 is in a free state. Here, the locking lever 50 returns to its original position by the elastic forces of the first and second springs 55 and 56, as shown in FIG. 2D.

However, in the tray locking apparatus having the above structure, current is continuously applied to the coil 61 to generate the electromagnetic force to compensate for the attracting force by the permanent magnet 64. Thus, a locking state in which the hook portion 51a of the locking lever 50 and the locking pin 35 are coupled is maintained, and electric power consumption increases. In view of the need for an energy saving apparatus, an improved apparatus capable of saving electric power is needed.

SUMMARY OF THE INVENTION

Accordingly, it is an object of the present invention to provide a tray locking apparatus of a disc drive which reduces electric power consumption and stably maintains a locking state of the tray.

Additional objects and advantages of the invention will be set forth in part in the description which follows and, in part, will be obvious from the description, or may be learned by practice of the invention.

The foregoing and other objects of the present invention are achieved by providing a tray locking apparatus of a disc drive to lock a tray on which a disc is placed and which is inserted into a main body of the disc drive, the apparatus including a locking boss provided at the main body; a locking plate installed at the tray to slide and having a locking portion provided at a side thereof which is caught by the locking boss as the tray enters the main body; an elastic member to elastically bias the locking plate in a direction in which the locking portion is caught by the locking boss; and a driving mechanism to slide the locking plate out of a position where the locking portion is caught by the locking boss when the tray is drawn.

The forgoing and other objects of the present invention are also achieved by providing a tray locking apparatus of a disc drive to lock a tray on which a disc is placed and which is inserted into a main body of the disc drive, the apparatus including a locking boss provided at the main body; a locking plate installed at the tray to slide and having a locking portion provided at a side thereof which is caught by the locking boss as the tray enters the main body; an elastic member to elastically bias the locking plate in a direction in which the locking portion is caught by the locking boss; and a driving mechanism to rotate the locking plate out of a position where the locking portion is caught by the locking boss when the tray is drawn.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
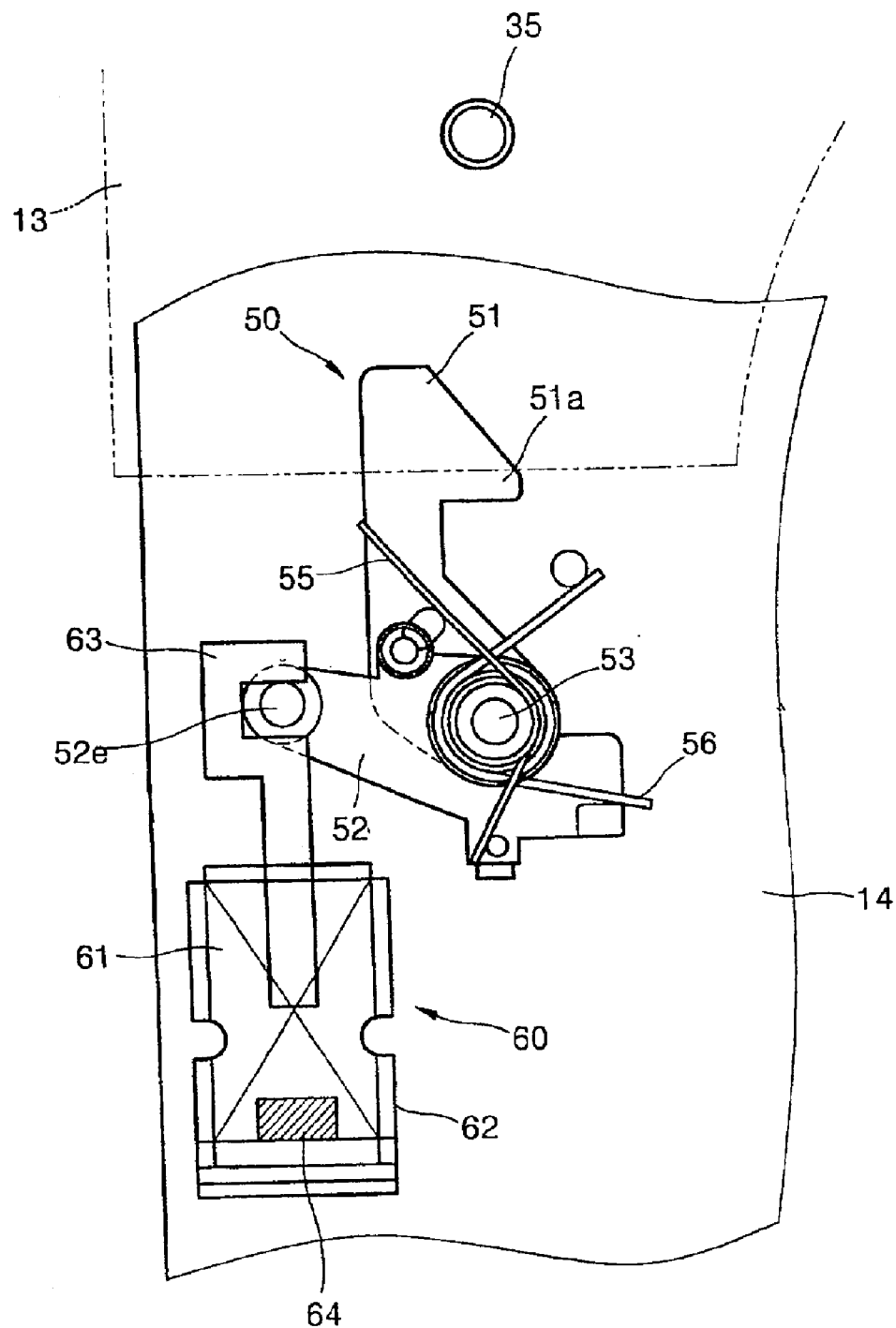
FIG. 1 is a view showing a conventional tray locking apparatus.
Figure 2A:
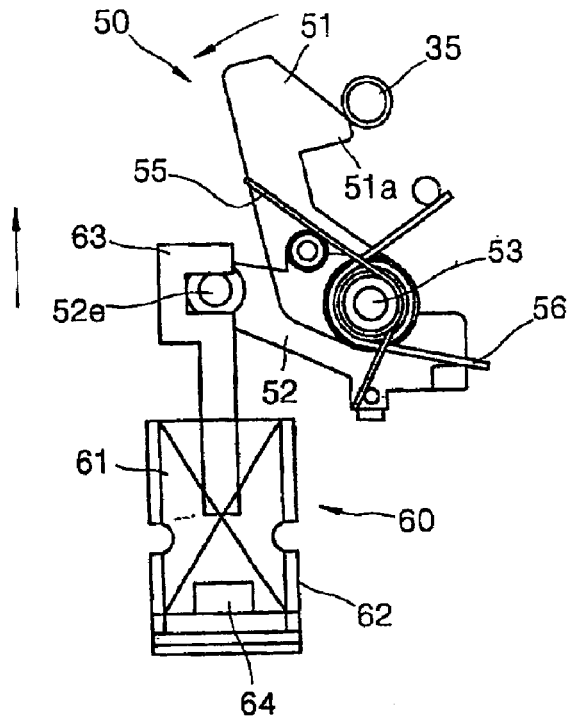
FIGS. 2A through 2D are views sequentially showing locking and unlocking processes of the tray locking apparatus of FIG. 1.
Figure 2B:
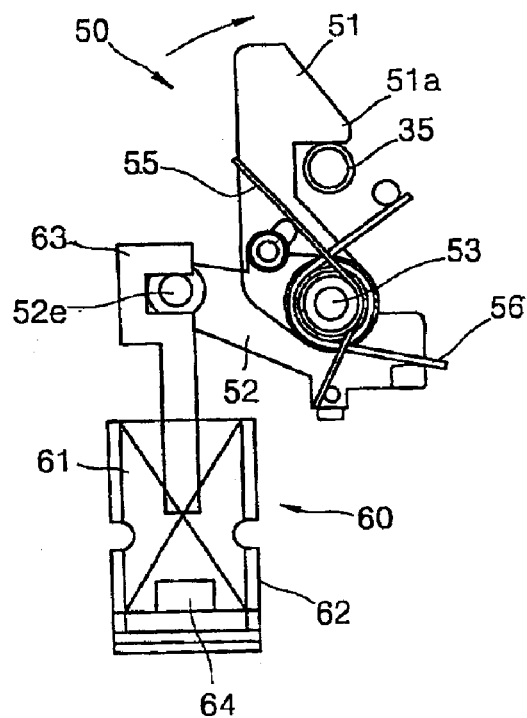
Figure 2C:
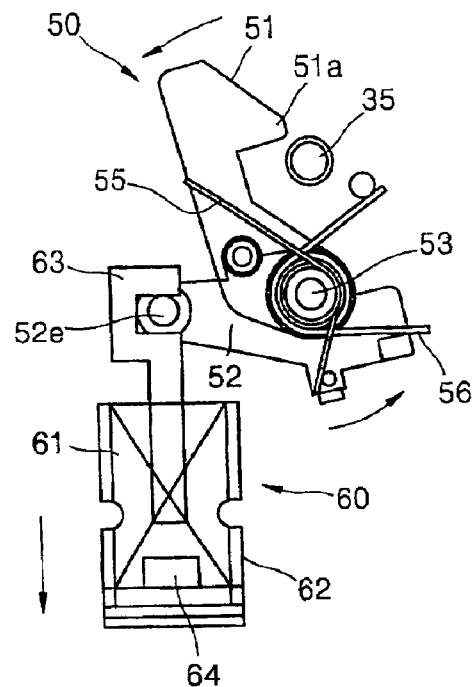
Figure 2D:
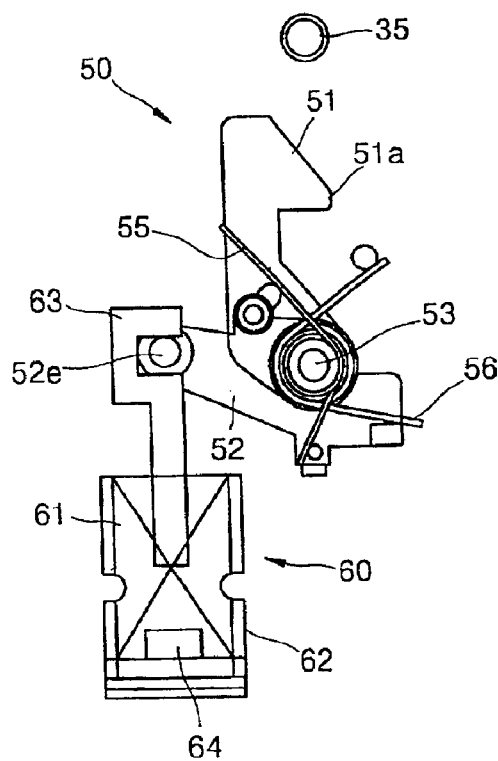

Reference will now be made in detail to the present preferred embodiments of the present invention, examples of which are illustrated in the accompanying drawings, wherein like reference numerals refer to like elements throughout.

Figure 3:
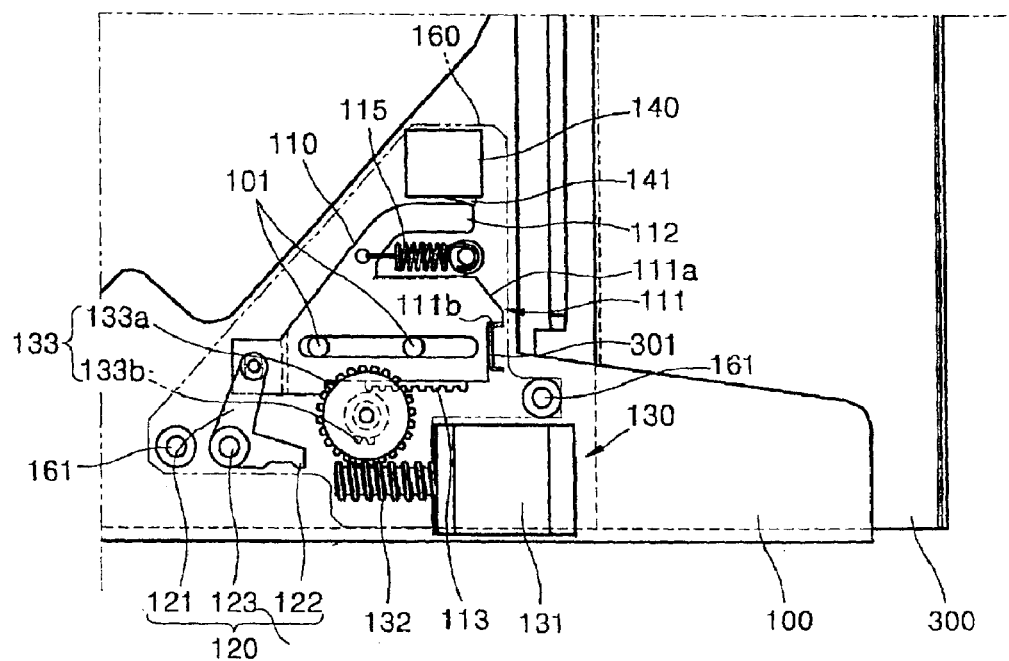
FIGS. 3 through 6 are views sequentially showing the processes from the locking state to the unlocking state in a tray locking apparatus according to a first embodiment of the present invention.

FIGS. 3 through 7 show one side of a tray having a locking apparatus according to a first embodiment of the present invention. Referring to FIG. 3, a locking boss 301 to lock a tray 100 is provided in a main body 300 of a disc drive. A bracket 160 is fixedly installed by a coupling member 161 on the lower surface of the tray 100. A locking plate 110 having a locking portion 111 caught by the locking boss 301 as it enters the main body 300 is installed by being supported by a guide boss 101 to slide with respect to the bracket 160. The locking plate 110 is elastically biased by a spring 115 in a direction in which the locking portion 111 is caught by the locking boss 301. A manual unlocking lever 120 is installed to rotate around a rotation shaft 123 provided at the bracket 160 and has a first end portion 121 coupled to the locking plate 110 and a second end portion 122 to be manually pressed by a user. Thus, when the user presses the second end portion 122 of the manual unlocking lever 120, the manual unlocking lever 120 rotates counterclockwise so that the locking plate 110 is moved in an unlocking direction, that is, to the left side, as shown in FIG. 3.

Also, there is a driving mechanism 130 to move the locking plate 110 in the direction opposite to the direction of the elastic force of the spring 115 to automatically unlock the tray 100 when needed. The driving mechanism 130 includes a motor 131, a gear portion 113 formed at the locking plate 110, a worm 132 and a worm wheel 133, which are intermediary gears to transmit power between the motor 131 and the gear portion 113. The worm wheel 133 has a first gear 133a engaged with the worm 132, and a second gear 133b, selectively engaged with the gear portion 113 of the locking plate 110 according to the rotation of the worm wheel 133. Thus, as the motor 131 rotates, the worm wheel 133 is connected to the worm 132 via the first gear 133a. Here, as the second gear 133b is engaged with the gear portion 113 of the locking plate 110, the locking plate 110 slides.

A limit switch 140 detects a limited moved position of the locking plate 110. In the locking state, a contact portion 112 provided at the locking plate 110 presses a switch lever 141 of a limit switch 140. When the locking plate 110 moves to the left to unlock, the switch lever 141 is released (refer to FIG. 5). Thus, the stop timing of the motor 131 is controlled by detecting the moment when the switch lever 141 is released.

When the tray 100 having the above locking apparatus enters the main body 300 of the disc drive, as shown in FIG. 3, the locking portion 111 of the locking plate 110 elastically biased by the spring 115 is elastically caught by the locking boss 301, thus maintaining a firm locking state. That is, when the tray 100 enters, an inclined surface 111a of the locking portion 111 bumps against the locking boss 301 and the locking plate 110 is slightly pushed to the left. When the tray 100 completely enters, the locking plate 110 returns to its original position by the elastic force of the spring 115 and a hook surface 111b of the locking portion 111 is caught by the locking boss 301. Here, the contact portion 112 continues to press the switch lever 141 of the limit switch 140. Since the locking state of the locking portion 111 and the locking boss 301 is maintained by the elastic force of the spring 115, additional electric power to maintain the locking state is not needed.

In the locking state, recording and reproduction processes are performed. Even when an impact is applied from the outside, the elastic force of the spring 115 prevents the locking plate 110 from moving in an unlocking direction. Furthermore, since the locking plate 110 does not rotate, but moves linearly, the locking plate 110 is hardly moved unless the direction in which an impact is applied matches the direction in which the locking plate 110 moves. Thus, even when an external impact is applied during the recording or reproduction process, the locking state can be maintained.

Figure 4:
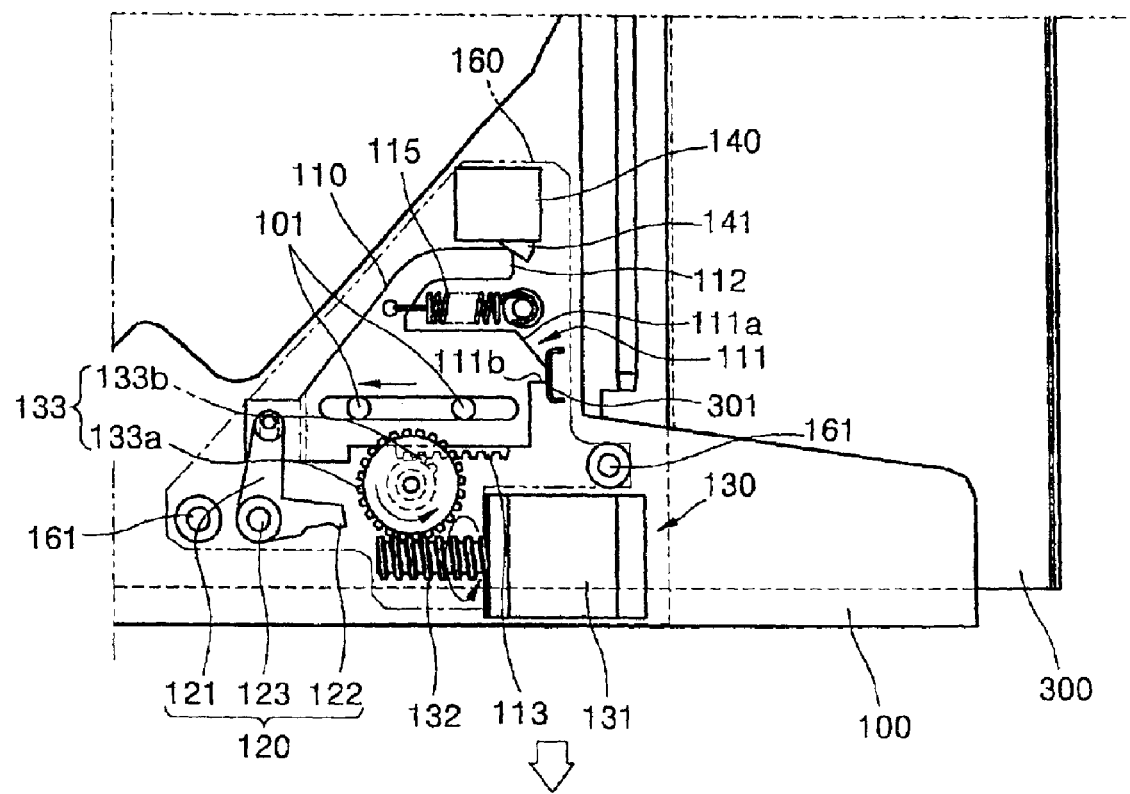

Next, when a user presses an eject button (not shown) of the disc drive to eject the tray 100 from the main body 300, the motor 131 is driven and the worm 132 and the worm wheel 133 are rotated. As shown in FIG. 4, as the second gear 133b is engaged with the gear portion 113, the locking plate 110 is moved to the left. Accordingly, the locking portion 111 is unlocked from the locking boss 301, and a push unit (not shown) to apply an elastic force from the main body 300 to the tray 100 inside the main body 300 pushes the tray 100 out of the main body 300.

Figure 5:
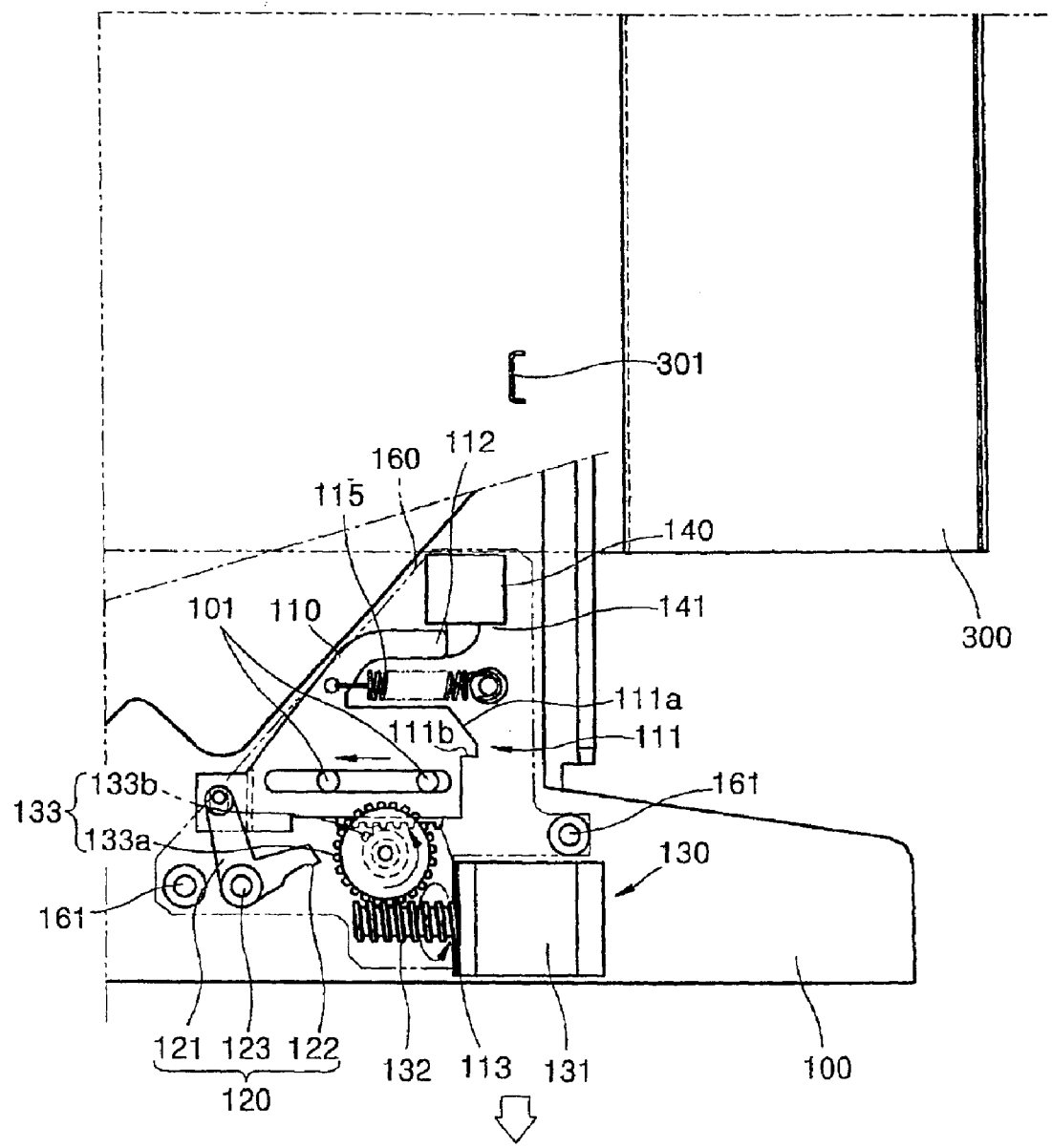
Figure 6:
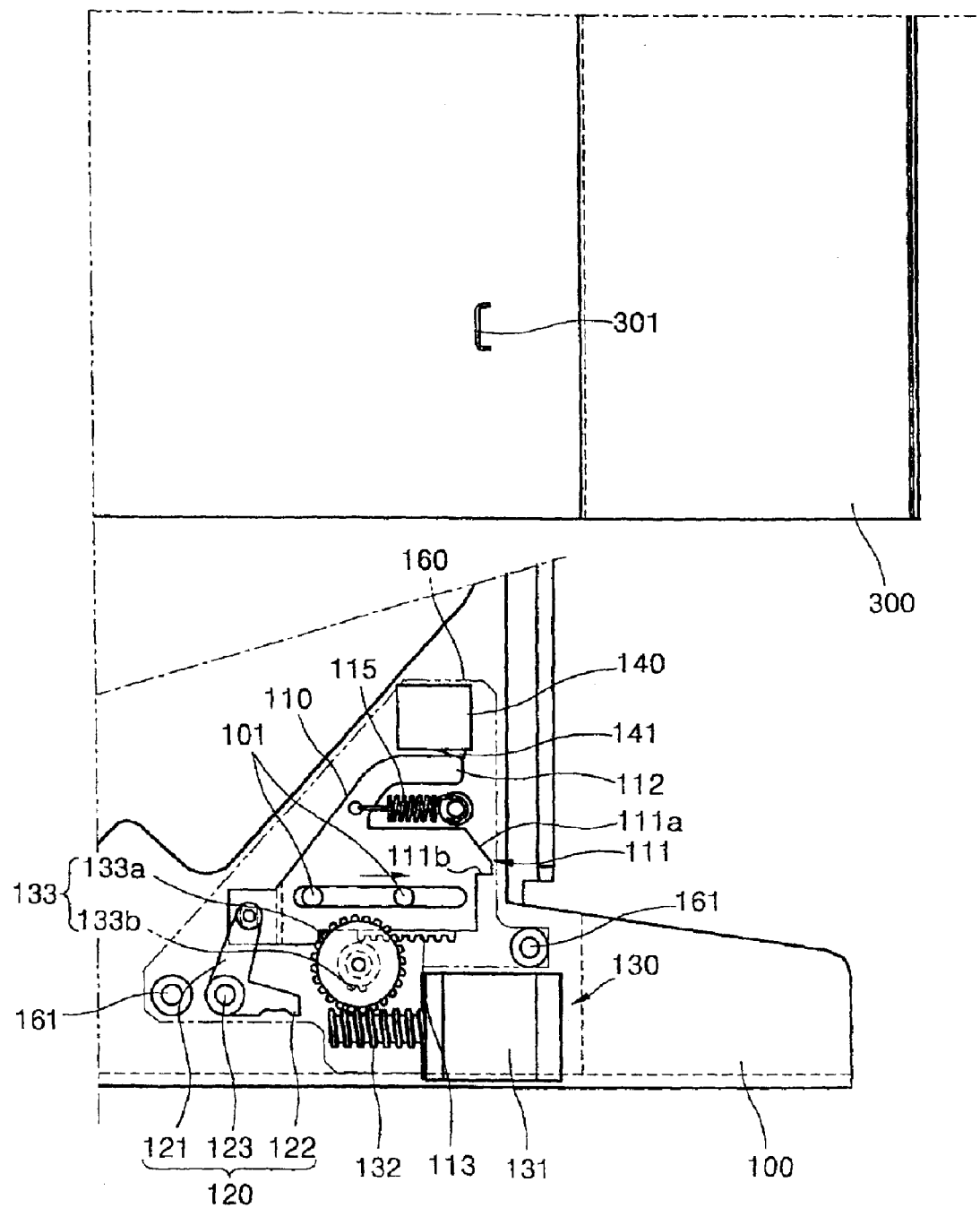

Then, the tray 100 is ejected out of the main body 300, as shown in FIG. 5. The locking plate 110 continues to move so that, when the contact portion 112 is completely separated from the switch lever 141 of the limit switch 140, the second gear 133b is separated from the gear portion 113. Then, the force to move the locking plate 110 to the left is cut off so that the locking plate 110 returns to the original position by the elastic force of the spring 115, as shown in FIG. 6, and the motor 131 stops. Since electric power is instantaneously provided only when the unlocking operation is carried out, and the current is not supplied during the remaining time, a very small amount of electric power is consumed to perform the locking and unlocking operations.

Figure 7:
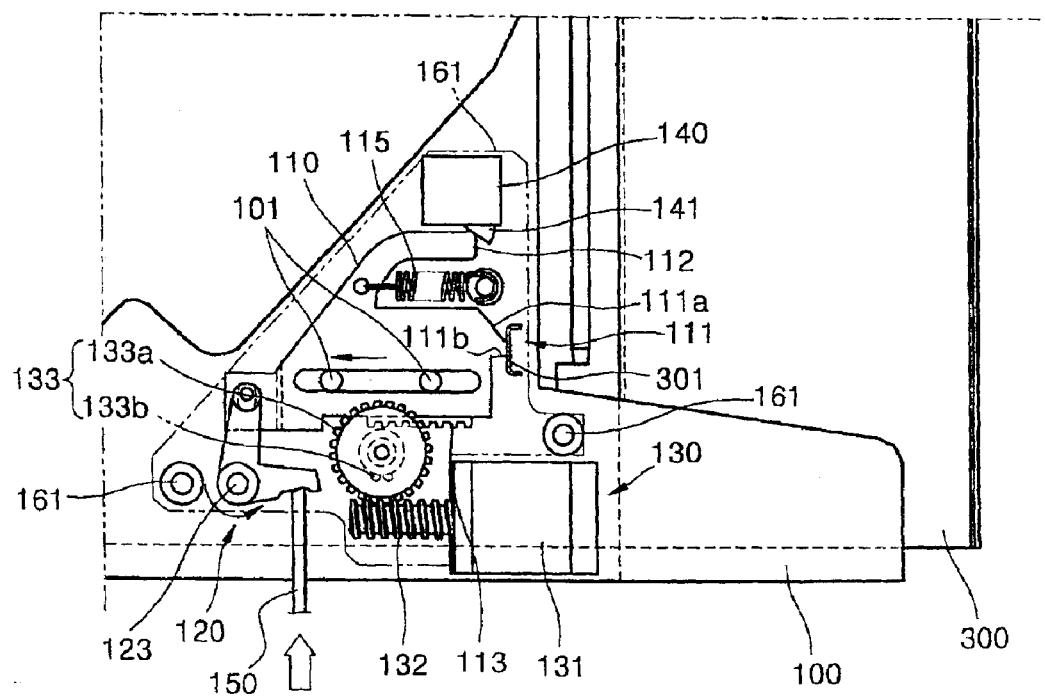
FIG. 7 is a view showing the state in which the tray locking apparatus shown in FIG. 3 is manually unlocked.

Meanwhile, when the tray 100 locked in the main body 300 is to be manually drawn from the main body 300 without a supply of electric power, as shown in FIG. 7, the second end portion 122 of the manual unlocking lever 120 is pressed by using an object such as a pin 150 from the front surface of the tray 100. Then, the manual unlocking lever 120 rotates around the rotation shaft 123 so that the locking plate 110 is moved to the left. Accordingly, as the locking portion 111 is unlocked from the locking boss 301, the tray 100 is drawn from the main body 300. Then, when the force pressing the second end portion 122 of the manual unlocking lever 120 is removed, both the locking plate 110 and the manual locking lever 120 return to their original positions. Thus, the tray locking apparatus can smoothly perform locking and unlocking operations with a very small amount of electric power compared to the conventional technology.

In the above embodiment, for the convenience of assembly, the structural elements of the locking apparatus including the locking plate 110, the motor 131, the manual unlocking lever 120, and the limit switch 140 are all installed at the bracket 160, as one unit, and the bracket 160 is fixed to the tray 100 by the coupling member 161. However, the bracket 160 may be omitted and the above structural elements can be directly installed at the tray 100.

Next, FIGS. 8 through 12 each show one side of the lower surface of a tray where a locking apparatus according to a second embodiment of the present invention is installed.

Figure 8:
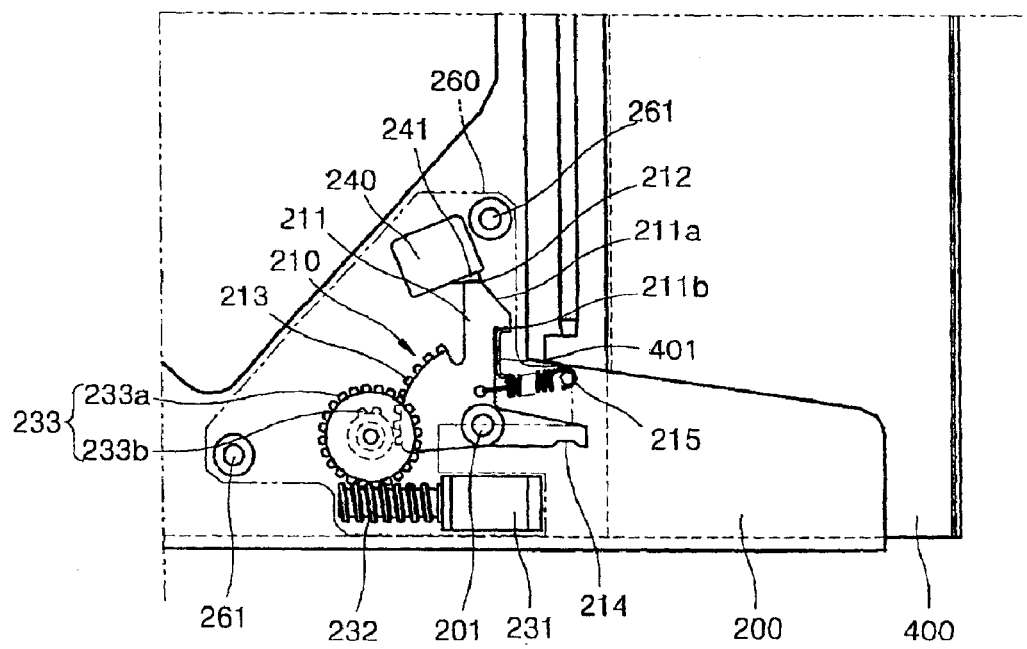
FIGS. 8 through 11 are views sequentially showing the processes from the locking state to the unlocking state in a tray locking apparatus according to a second embodiment of the present invention.

Referring to FIG. 8, a locking boss 401 to lock a tray 200 is provided in the main body 400 of a disc drive. A bracket 260 is fixedly installed by a coupling member 261 on the lower surface of the tray 200. A locking plate 210 having a locking portion 211 which is caught by the locking boss 401 when the locking plate 210 is inserted into the main body 400, is installed on the bracket 260 to rotate around a rotation shaft 201. The locking plate 210 is elastically biased by a spring 215 in a direction in which the locking portion 211 is caught by the locking boss 401, that is, clockwise as shown in FIG. 8. A manual push portion 214 is provided at one side of the locking plate 210 to manually rotate the locking plate 210. Thus, when a user presses the manual push portion 214, the locking plate 210 rotates counterclockwise.

Also, there is a driving mechanism 230 to automatically unlock the locking plate 210, if necessary, by rotating the locking plate 210 in the direction opposite to the direction in which the elastic force of the spring 215 acts. The driving mechanism 230 includes a motor 231, a gear portion 213 formed at the locking plate 210, a worm 232, and a worm wheel 233 as an intermediary gear to transfer power between the motor 231 and the gear portion 213. The worm wheel 233 includes a first gear 233a engaged with the worm 232, and a second gear 233b. The second gear 233b is partially formed so as to be selectively engaged with the gear portion 213 of the locking plate 210 according to the rotation of the worm wheel 233. Thus, as the motor 231 rotates, the worm wheel 233 is connected to the worm 232 via the first gear 233a. Here, as the second gear 233b is engaged with the gear portion 213 of the locking plate 210, the locking plate 210 rotates.

Furthermore, there is a limit switch 240 to detect a limited moved position of the locking plate 210. In the locking state, a contact portion 212 provided at the locking plate 210 presses a switch lever 241 of the limit switch 240. When the locking plate 210 rotates counterclockwise, the switch lever 241 is released (refer to FIG. 10). Thus, the stop timing of the motor 231 is controlled by detecting the moment when the switch lever 241 is released.

When the tray 200 having the above locking apparatus enters the main body 400 of the disc drive, as shown in FIG. 8, the locking portion 211 of the locking plate 210 is elastically caught by the locking boss 401, thus maintaining a firm locking state. That is, when the tray 200 enters, an inclined surface 211a of the locking portion 211 bumps against the locking boss 401, and the locking plate 210 is slightly pushed counterclockwise. When the tray 200 completely enters, the locking plate 210 returns to its original position by the elastic force of the spring 215 and a hook surface 211b of the locking portion 211 is caught by the locking boss 401. Here, the contact portion 212 continues to press the switch lever 241 of the limit switch 240. Since the locking state of the locking portion 211 and the locking boss 401 is maintained by the elastic force of the spring 215, the additional electric power to maintain the locking state is not consumed.

Figure 9:
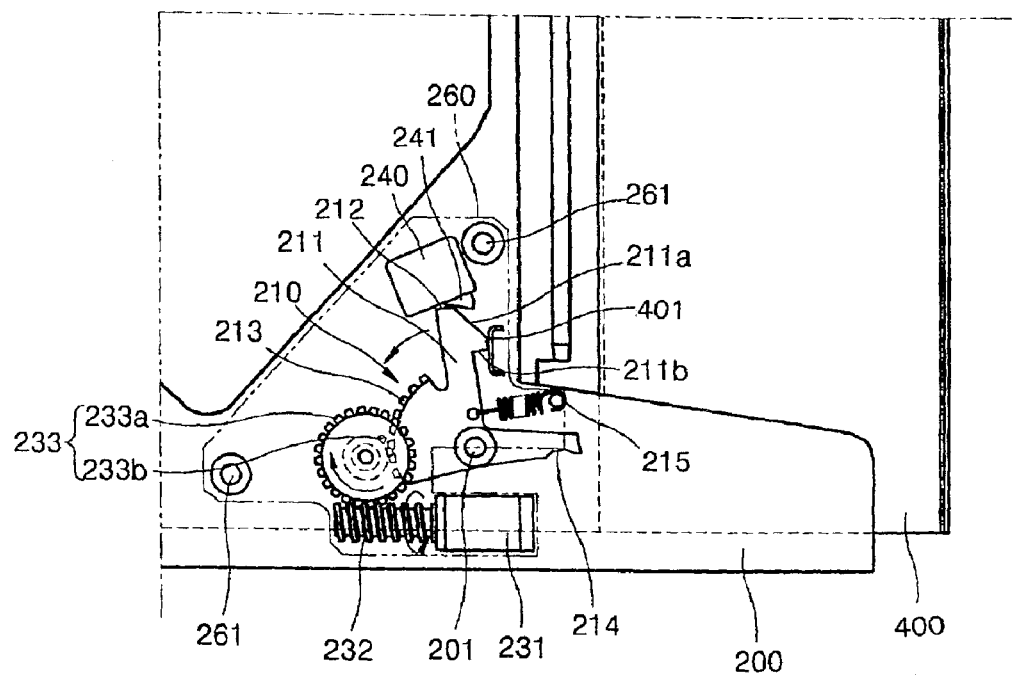

Next, when a user presses an eject button (not shown) of the disc drive to eject the tray 200 from the main body 400, the motor 231 is driven and the worm 232 and the worm wheel 233 are rotated. As shown in FIG. 9, as the second gear 233b is engaged with the gear portion 213, the locking plate 210 is rotated counterclockwise. Accordingly, the locking portion 211 is unlocked from the locking boss 401, and a push unit (not shown) to apply an elastic force out of the main body 400 to the tray 200 inside the main body 400 pushes the tray 200 out of the main body 400.

Figure 10:
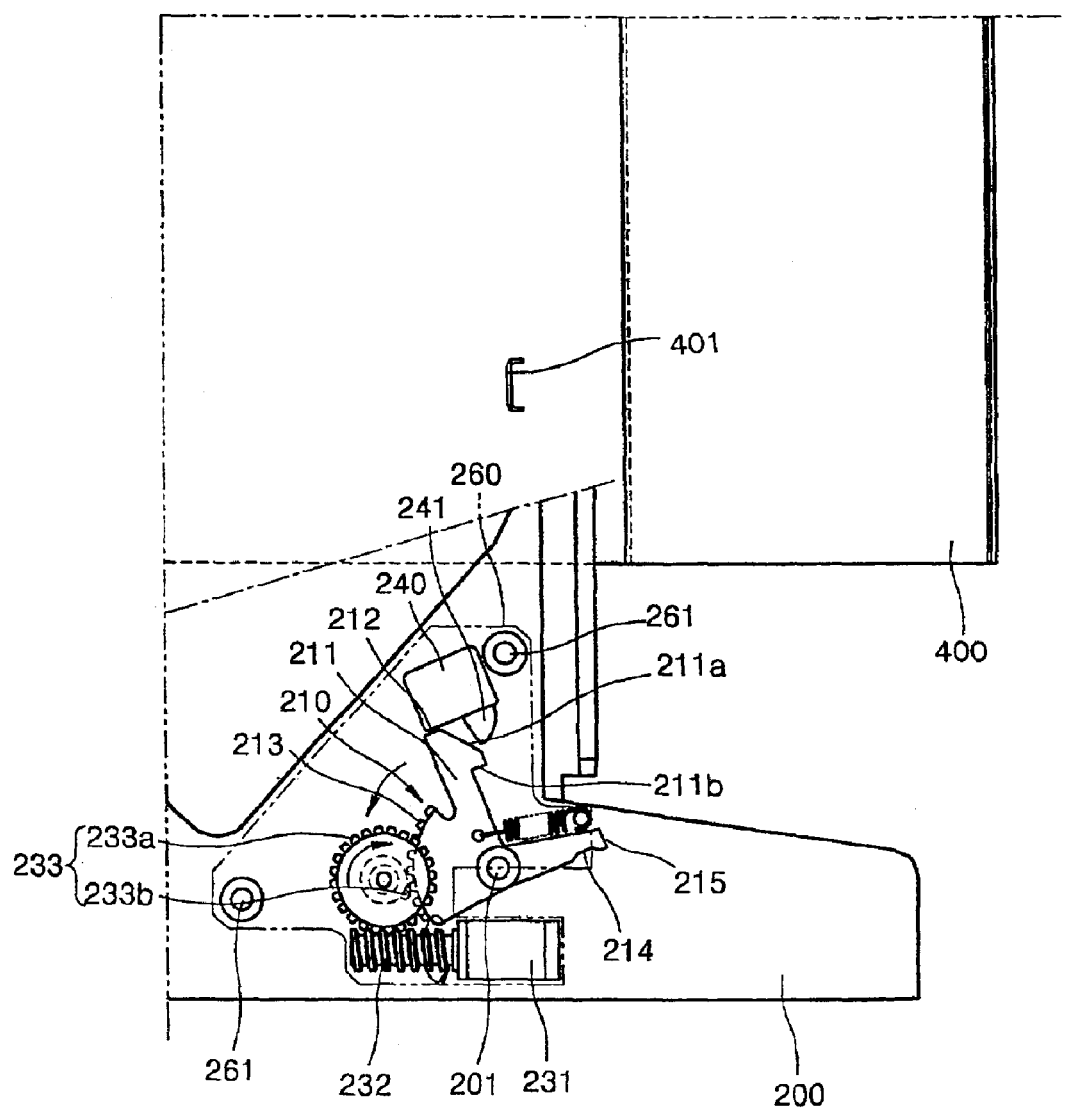
Figure 11:
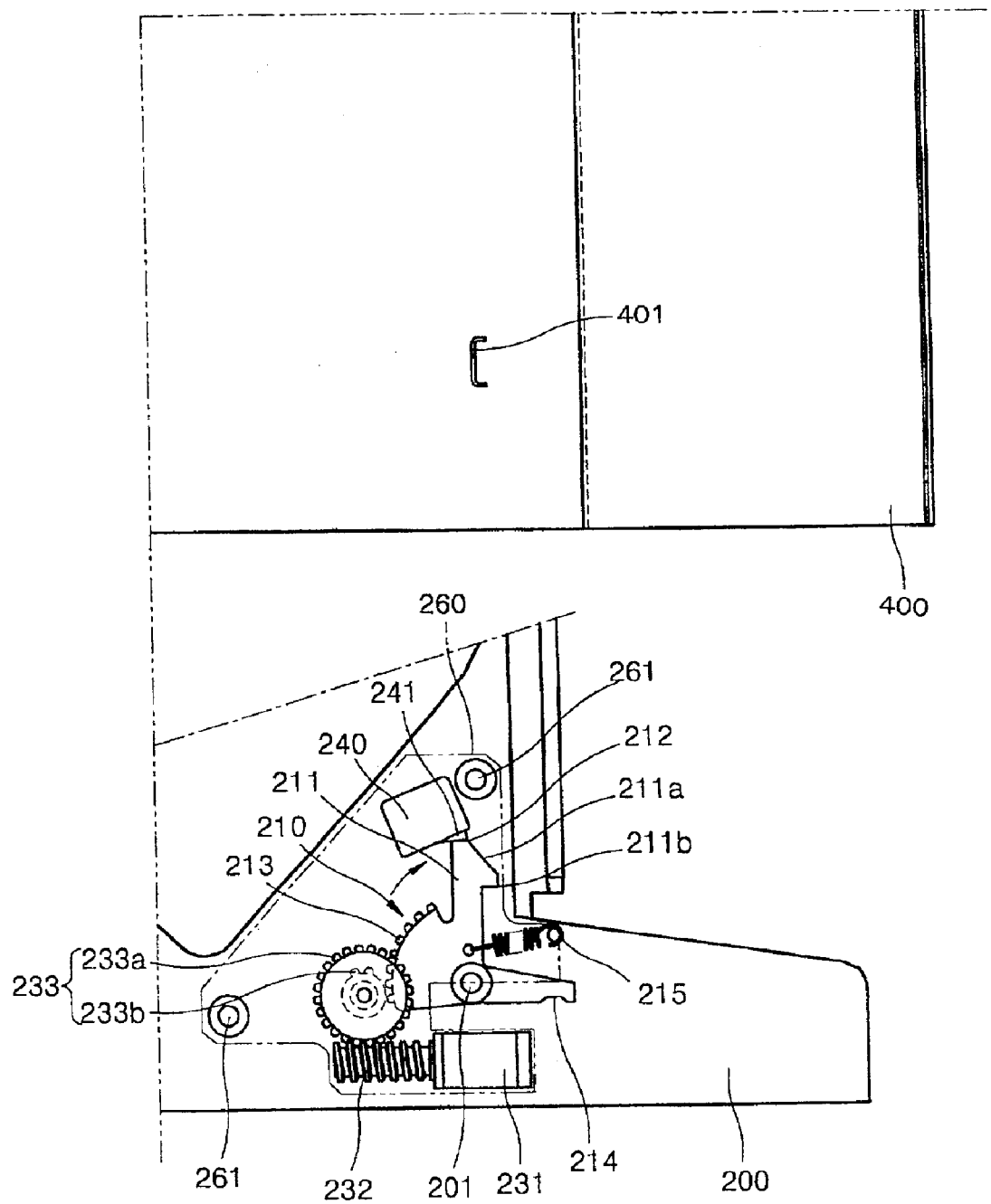

Then, the tray 200 is ejected out of the main body 400, as shown in FIG. 10. The locking plate 210 continues to rotate so that, when the contact portion 212 is completely separated from the switch lever 241 of the limit switch 240, the second gear 233b is separated from the gear portion 213. Then, the force to rotate the locking plate 210 counterclockwise is cut off so that the locking plate 210 returns to the original position by the elastic force of the spring 215, as shown in FIG. 11, and the motor 231 stops. Since electric power is instantaneously provided only when the unlocking operation is carried out, and the current is not supplied for the remaining time, a very small amount of electric power is consumed for the locking and unlocking operations.

Figure 12:
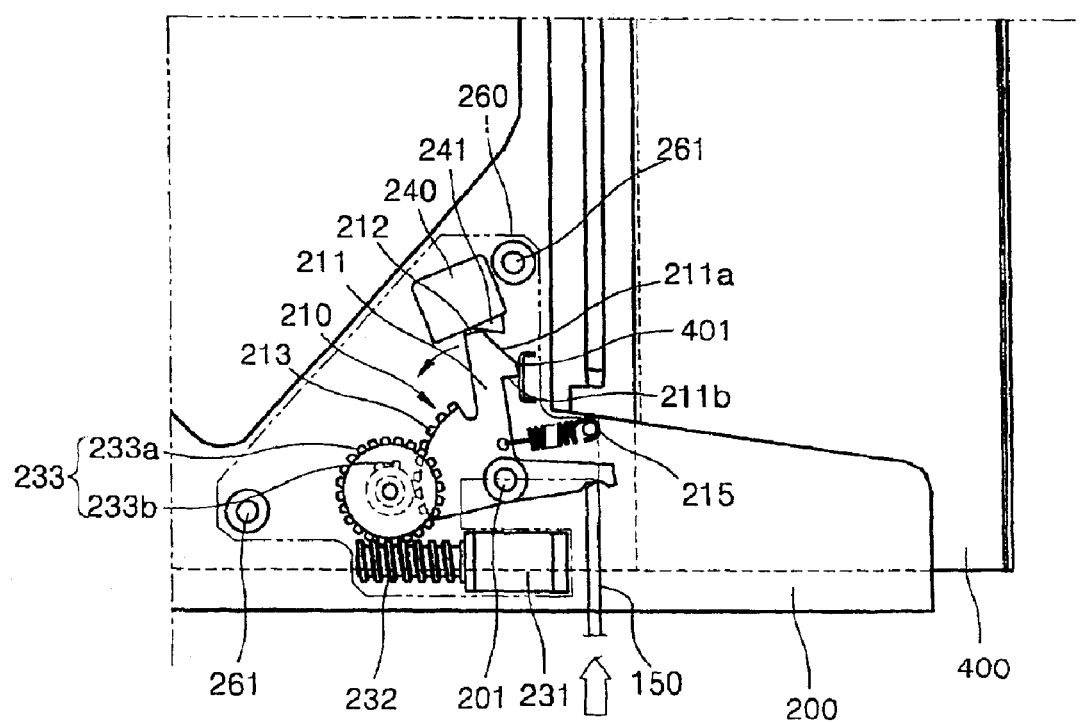
FIG. 12 is a view showing the state in which the tray locking apparatus shown in FIG. 8 is manually unlocked.

Meanwhile, when the tray 200 locked in the main body 400 is to be manually drawn from the main body 400 without a supply of electric power, as shown in FIG. 12, the manual push portion 214 is pressed by using an object such as the pin 150 from the front surface of the tray 200. Then, the locking plate 210 rotates around the rotation shaft 201. Accordingly, as the locking portion 211 is unlocked from the locking boss 301, the tray 200 is drawn from the main body 40. Then, when the force pressing the manual push portion 214 is removed, the locking plate 210 returns to the original position. Thus, the locking and unlocking operations can be done with a very small amount of electric power compared to the conventional technology.

In this embodiment, for the convenience of assembly, the structural elements to lock can be provided at the bracket 260 as one unit, and the unit is fixed to the tray 200 by the coupling member 261. However, the bracket 260 may also be omitted and the structural elements can be directly installed at the tray 200.

As described above, in the tray locking apparatus of a disc drive according to the present invention, power consumption needed to lock and unlock operations can be greatly reduced while the locking state can be firmly maintained.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A tray locking apparatus of a disc drive to lock a tray on which a disc is placed and which is inserted into a main body of the disc drive, the apparatus comprising:
   a locking boss provided at the main body;
   a locking plate installed at the tray to slide and having a locking portion provided at a side thereof which is caught by the locking boss as the tray enters the main body;
   an elastic member to elastically bias the locking plate in a direction in which the locking portion is caught by the locking boss; and
   a driving mechanism to slide the locking plate out of a position where the locking portion is caught by the locking boss when the tray is drawn.

2. The apparatus as claimed in claim 1, wherein the driving mechanism
   comprises:
   a motor installed at the tray;
   a gear portion provided at the locking plate; and
   an intermediary gear to transmit power between the motor and the gear portion.

3. The apparatus as claimed in claim 2, wherein the motor comprises a rotation shaft, and the intermediary gear comprises:
   a worm installed at the rotation shaft of the motor; and
   a worm wheel having a first gear engaged with the worm and a second gear, coaxial with the first gear, and engaged with the gear portion.

4. The apparatus as claimed in claim 3, wherein the second gear is selectively engaged with the gear portion according to a rotation of the worm wheel.

5. The apparatus as claimed in claim 2, wherein the driving mechanism further comprises a limit switch to selectively contact the locking plate and to detect a moved position of the locking plate.

6. The apparatus as claimed in claim 1, wherein the driving mechanism comprises a motor having a rotation shaft, and the apparatus further comprises a manual unlocking lever rotatably installed on the tray, having a first end coupled to the locking plate and a second end extended from the rotation shaft and manually pressed by a user, wherein, when the second end of the manual unlocking lever is pressed, the first end of the manual unlocking lever rotates and the locking plate is moved to be out of the position where the locking portion is caught by the locking boss.

7. The apparatus as claimed in claim 1, wherein the locking plate moves linearly in a direction perpendicular to a direction of movement of the tray.

8. A tray locking apparatus of a disc drive in which the tray is drawn into and out of the disc drive, comprising:
   a locking boss connected to the disc drive;
   locking portion of the tray to be locked by the locking boss;
   an elastic member to provide a sole force in a direction in which the locking portion is locked by the locking boss to maintain a locked state of the locking boss and the tray; and
   a driving mechanism to slide the tray out of a position where the locking portion is locked by the locking boss.

9. The apparatus as claimed in claim 8, wherein an elastic force of the elastic member biases the locking plate in a direction in which the locking plate is caught by the locking boss.

10. The apparatus as claimed in claim 8, wherein the locking plate slides with respect to the locking boss.

11. The apparatus as claimed in claim 8, further comprising:
    a driving mechanism to move the locking plate in an unlocked state of the locking boss and the locking plate.

12. The apparatus as claimed in claim 11, wherein the driving mechanism comprises:
    a motor;
    a gear portion provided at the locking plate; and
    an intermediary gear to transmit power between the motor and the gear portion.

13. The apparatus as claimed in claim 11, wherein the driving mechanism moves the locking plate only during the operation of unlocking the locking boss and the locking plate.

14. A tray locking apparatus of a disc drive in which the tray is drawn into and out of the disc drive, comprising:
    a locking boss connected to the disc drive;
    locking portion of the tray to be locked by the locking boss;
    an elastic member to maintain a locked state of the locking boss and the tray by biasing the tray in a direction in which the locking portion is locked by the locking boss; and
    a driving mechanism to slide the tray out of a position where the locking portion is locked by the locking boss.

15. A tray locking apparatus of a disc drive in which the tray is drawn into and out of the disc drive, comprising:
    a locking boss connected to the disc drive;
    a locking portion of the tray to occupy a position in which the locking portion is locked by the locking boss;
    an elastic member to constantly bias the tray toward the position in which the locking portion is locked by the locking boss; and
    a driving mechanism to slide the tray out of the position in which the locking portion is locked by the locking boss.

* * * * *

UNITED STATES PATENT AND TRADEMARK OFFICE
CERTIFICATE OF CORRECTION

PATENT NO. : 6,993,775 B2
DATED : January 31, 2006
INVENTOR(S) : Byoung-young Bae et al.

It is certified that error appears in the above-identified patent and that said Letters Patent is hereby corrected as shown below:

<u>Column 8,</u>
Lines 1 and 32, insert -- a -- before "locking portion".

Signed and Sealed this

Fourth Day of April, 2006

JON W. DUDAS
*Director of the United States Patent and Trademark Office*